United States Patent [19]

Kanda

[11] Patent Number: 4,788,671
[45] Date of Patent: Nov. 29, 1988

[54] INFORMATION RECORDING AND REPRODUCING APPARATUS FOR EFFECTING SIMULTANEOUS RECORDING AND REPRODUCTION BUT AT DIFFERENT RATES

[75] Inventor: Shigeto Kanda, Machida, Japan

[73] Assignee: Canon Kabushiki Kaisha, Tokyo, Japan

[21] Appl. No.: 686,152

[22] Filed: Dec. 26, 1984

[30] Foreign Application Priority Data

Jan. 9, 1984 [JP] Japan .................................. 59-834

[51] Int. Cl.$^4$ ............................................. G11B 11/00
[52] U.S. Cl. ........................................ 369/13; 369/14; 369/111; 360/86
[58] Field of Search ..................... 369/13, 32, 45, 60, 369/111, 14; 360/78, 86, 7

[56] References Cited

U.S. PATENT DOCUMENTS 3,636,253 1/1972 Notani et al. .................... 360/86 X
3,641,278 2/1972 Kinjo et al. ........................ 360/86
3,924,146 12/1975 George ............................ 360/78 X
4,387,452 6/1983 Bricot et al. ......................... 369/32
4,561,032 12/1985 Matsumoto et al. ................ 360/114

OTHER PUBLICATIONS

NHK Laboratories Note, Ser. No. 285, Feb. 1983, Tokunau et al.

Primary Examiner—Aristotelis M. Psitos
Attorney, Agent, or Firm—Fitzpatrick, Cella, Harper & Scinto

[57] ABSTRACT

There is disclosed an information recording and reproducing apparatus which is provided with a disk-shaped recording medium having a recording face allowing information recording and reproduction from both sides; a recording head positioned at a side of the recording face to record information thereon; a reproducing head positioned at the other side of the recording face to reproduce information recorded on the recording face; and a rotary drive unit for independently driving at least two of the disk-shaped recording medium, recording head and reproducing head about a same axis and in the circumferential direction of the recording medium.

4 Claims, 3 Drawing Sheets

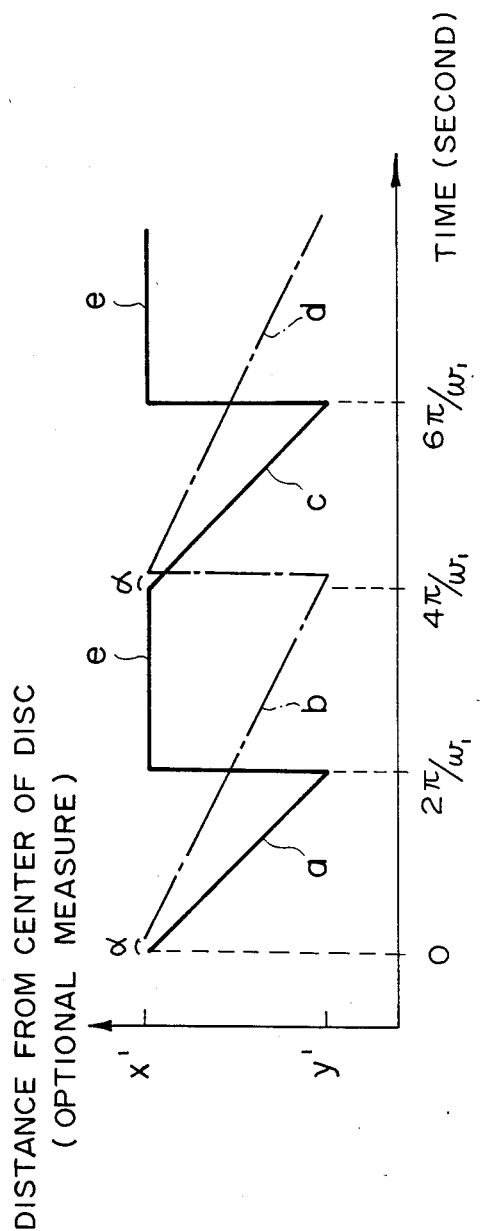
F I G. 5

INFORMATION RECORDING AND REPRODUCING APPARATUS FOR EFFECTING SIMULTANEOUS RECORDING AND REPRODUCTION BUT AT DIFFERENT RATES

BACKGROUND OF THE INVENTION

1. Field of the Invention

The present invention relates to an information recording and reproducing apparatus, and more particularly to such apparatus adapted for use as an interface for data transfer between units of different data transfer rates.

2. Description of the Prior Art

Conventionally so-called optical and magnetooptical disk apparatus are known as information recording and reproducing apparatus. Among such known apparatus, the magnetooptical disk apparatus, for example, has a structure as shown in FIG. 1.

In FIG. 1, a magnetooptical disk 10 is composed of a magnetic recording layer 18 formed on a disk-shaped transparent substrate 16 composed for example of glass or plastic material. A recording head 26, composed of a light source such as a laser, an optical system such as a collimating lens and an objective lens, external magnetic field generating means, focusing means etc. concentrates a recording light beam 46 from the light source onto the recording layer 18 to elevate temperature locally and simultaneously applies a magnetic field, thereby orienting the magnetization of said local area in the direction of the externally applied magnetic field and thus recording the information. A reproducing head 38 composed of a light source such as a laser, an optical system such as a collimating lens, an objective lens and a polarizer, a photosensor such as a PIN photodiode, focusing means, tracking means, etc. concentrates a reproducing polarized light beam of low power not affecting the magnetization of the recording layer 18 onto a determined track of the recording medium, thus reading the recorded information in the form of magnetization by means of magnetic Kerr effect. More specifically, a linearly polarized light beam (light with an electromagnetic vector vibrating only in one direction) obtained through the polarizer is directed onto the recording layer, and the reflected light, the plane of polarization is rotated according to the direction of magnetization of the recording layer, is guided through an analyzer to convert the rotation of the plane of polarization into a change in the light intensity and is received by a photosensor to reproduce the recorded information.

The magnetooptical disk 10 is rotated by a motor 12, while the recording head 26 and the reproducing head 38 are moved in the radial direction of said disk 10 respectively along rails 20, 34. Consequently the information is recorded in spiral form or concentric form on the magnetooptical disk 10 from the external periphery toward the interior.

In case of data transfer between two units of different data transfer rates, it is necessary to convert hhe data transfer rate. As an example, the data transfer from a unit I of a higher transfer rate R1 to another unit II of a lower transfer rate R2 (R1>R2) is generally conducted in the following manner. At first data are released from the unit I with the transfer rate R1 and are stored in memory means. In the course of or after said storage, the data are reproduced from said memory means at the transfer rate R2 and supplied to the unit II. The data transfer from the unit II to the unit I is also conducted by way of such memory means.

In this manner the mmory means is indispensable for the conversion of the transfer rate, and for this purpose a semiconductor memory such as a random access memory (RAM) has been employed. However such semiconductor memory has been associated with a drawback in that the cost per unit memory capacity is high.

For this reason there is considered the use of a magnetooptical disk apparatus as shown in FIG. 1 for the above-mentioned memory means. For example, in case of data transfer from the unit I of the transfer rate R1 to the unit II of the transfer rate R2 (R1>R2), the magnetooptical disk 10 is rotated at a rotary speed $\omega 1$, and a data train of a determined length (hereinafter called block data) is supplied from the unit I to form a record on a track 60 from X to Y, as shown in FIG. 2, by means of the recording head 26. Then the angular speed of the magnetooptical disk is changed to $\omega 2$ ($\omega 1 > \omega 2$) so as to obtain a transfer rate R2 of the reproduced data, and the data from X to Y are reproduced by the reproducing head 38 and supplied to the unit II. Upon completion of the signal reproduction, the angular speed is again changed to $\omega 1$, and new block data are released from the unit I and recorded anew on the track from X to Y. Subsequently the angular speed is changed again to $\omega 2$ for signal reproduction. The above-described procedure is repeated until all the required data are transferred from unit I to unit II.

The use of a magnetooptical apparatus for the conversion of the transfer rate allows the cost of the entire system to be reduced because of the large capacity and low cost of the magnetooptical disk. However such system requires a long data transfer time because the conventional magnetooptical disk apparatus requires a change in the rotational speed of the disk between the information recording and reproduction and is therefore unable to conduct the information recording and reproduction at the same time.

SUMMARY OF THE INVENTION

In consideration of the foregoing, the object of the present invention is to provide an information recording reproducing apparatus capable of recording information transferred at a determined rate and simultaneously reproducing said information at a different rate.

The foregoing object can be achieved according to the present invention by an information recording and reproducing apparatus comprising a disk-shaped recording medium allowing information recording and reproduction from both faces thereof; a recording head opposed to a face thereof to record information thereon; a reproducing head opposed to the other face of the recording medium to reproduce the information recorded thereon; and rotary drive means to rotate at least two of said disk-shaped recording medium, recording head and reproducing head independently along the circumferential direction of the recording medium about a common axis.

BRIEF DESCRIPTION OF THE DRAWINGS

FIG. 5 is a view showing the change in time of the position of a light spot in the information recording and reproducing apparatus shown in FIG. 3.

DETAILED DESCRIPTION OF THE PREFERRED EMBODIMENTS

Figure 1:
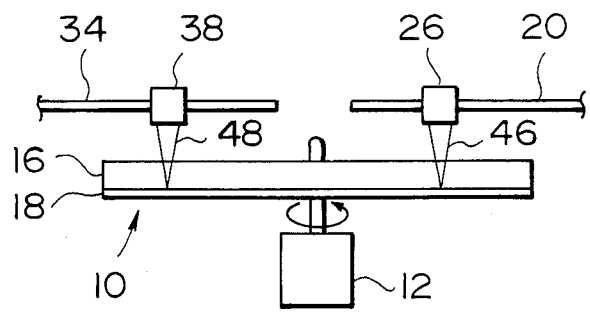
FIG. 1 is a schematic cross-sectional view of a conventional information recording and reproducing apparatus.
Figure 2:
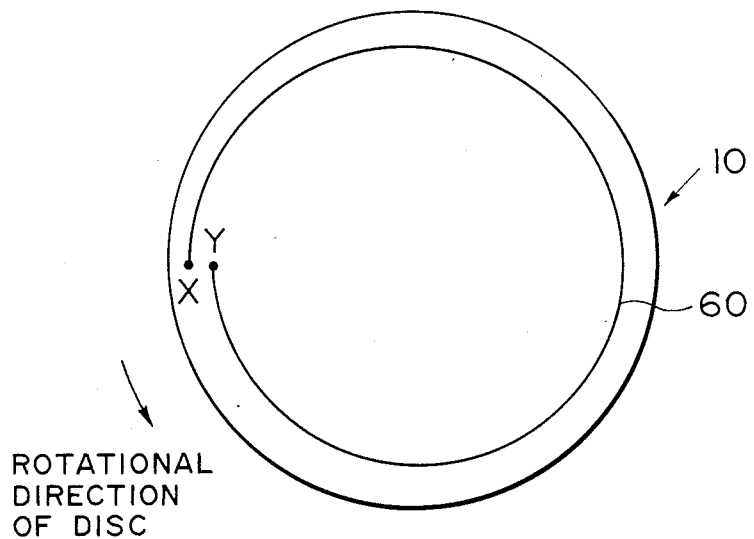
FIG. 2 is a plan view of a magnetooptical disk showing the mode of information recording and reproduction in the information recording and reproducing apparatus shown in FIG. 1.
Figure 3:
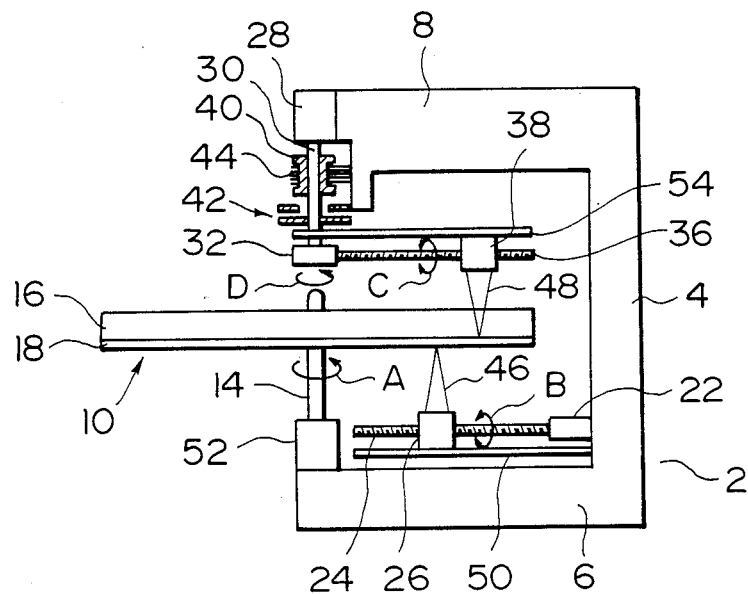
FIG. 3 is a schematic cross-sectional view of an information recording and reproducing apparatus embodying the present invention.

FIG. 3 is a schematic cross-sectional view of an information recording and reproducing apparatus embodying the present invention, wherein the same components as those in FIG. 1 are represented by the same numbers. A support member 2 is composed of a pillar 4, and a support 6 and an arm 8 projecting therefrom. At the end of the support 6 there is provided a first motor 52 constituting rotary drive means for rotating the magnetooptical disk 10, constituting the disk-shaped recording medium, in a direction A. A first motor shaft 14 of said motor 52 passes the center of said disk 10 and is fixed thereto. The magnetooptical disk 10 is composed of a magnetic recording layer 18 formed on a disk-shaped substrate 16 composed for example of glass or plastic material. On said pillar 4 there are provided a first rail 50 slightly apart from the support 6 and a first feed motor 22 which rotates a first feed screw 24 in a direction B. On said first rail 50 there is slidably provided the recording head 26, a threaded part of which engages with said first feed screw 24. Consequently the recording head 26 is moved in the radial direction of the magnetooptical disk 10 by the first feed motor 22.

At the end of said arm 8 there is provided a second motor 28 constituting rotary drive means for rotating a second motor shaft 30 in a direction D, the same as the rotating direction A of the magnetooptical disk 10. At the end portion of said second motor shaft 30 there are provided a second feed motor 32 and a second rail 54 slightly apart from said second feed motor 32. Said second feed motor 32 is provided with a second feed screw 36 which is rotated in a direction C by said second feed motor. On said second rail 54 there is slidably provided the reproducing head 36, a threaded portion of which engages with said second feed screw 36. Consequently, the reproducing head 38 is moved in the radial direction of the magnetooptical disk 10 by means of the second feed motor 32.

Around the second motor 30 there are provided a slip ring 40 for supplying electric power to the second feed motor 32, and a rotary transformer 42 for transmitting the reproduced signal. Said rotary transformer is composed of two members, one being fixed on the arm 8 while the other rotates with the second motor shaft. The slip ring 40 is maintained in contact with brushes 44. Thus, the second motor 28 integrally rotates the reproducing head 38, second feed screw 36, second rail 54, second feed motor 32 and a part of the rotary transformer 42. There are also shown a recording light beam 46 emitted from the recording head 26, and a polarized reproducing light beam 48 emitted from the reproducing head 38.

In the following there will be explained the function of the above-described information recording and reproducing apparatus of the present invention, in an example of use as memory means in the data transfer from an unrepresented unit I with a transfer rate R1 to another unrepresented unit II with a transfer rate R1/2.

The recording light beam 46 emitted from the recording head 26 is concentrated, by means of focusing means incorporated therein, onto the recording layer 18 to generate a local temperature rise therein. Unrepresented magnetic field generating means incorporated in said recording head 26 generates a magnetic field in an area including said local area of temperature rise, in a direction perpendicular to the recording layer 18 and upward or downward according to the signal "1" or "0" transferred from the unit I. Thus a magnetic domain is formed in the recording layer 18 according to said magnetic field.

Figure 4:
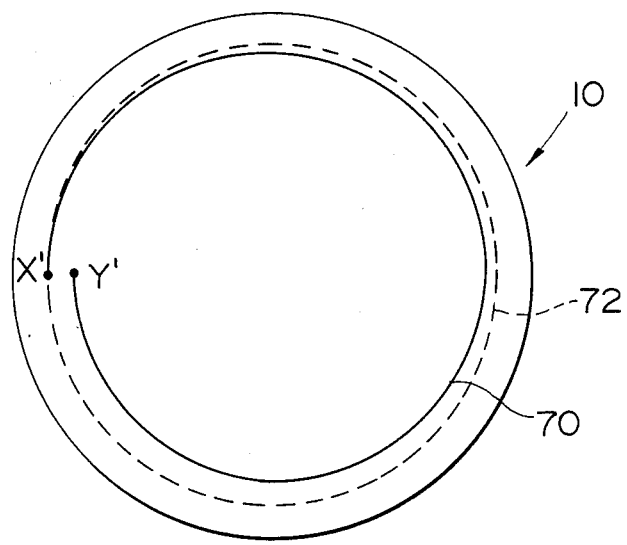
FIG. 4 is a plan view of a magnetooptical disk showing the mode of information recording and reproduction in the information recording and reproducing apparatus shown in FIG. 3.

FIG. 4 is a plan view of said magnetooptical disk 10. The block data transferred from the unit I are recorded from a point X' to Y' shown in FIG. 4, along a trajectory 70 by the rotation of the first feed screw 24 by the first feed motor 22. It is assumed that the magnetooptical disk 10 rotates with an angular speed $\omega 1$ (rad/sec.), and that X' and Y' are present one the same radius. The reproducing head 38 rotated by the second motor 28 starts signal reproduction with the polarized reproducing light beam 48, starting from the position X' after a short time $\alpha$ from the start of signal recording. Said short time is provided in order to avoid simultaneous signal recording and reproduction on the same point, since exact signal reproduction cannot be expected at the position currently under signal recording as the intensity of magnetization is reduced by local heating by the recording beam 46. On the other hand, the magnetic field from the recording head 26 does not affect the signal reproduction, since the magnetization of the recording layer 18 is fully saturated in the absence of the light beam. The spot of the polarized reproducing light beam 48 is so controlled as to trace the trajectory 70 by means of tracking means incorporated in the reproducing head 38 and the second feed motor 32. The reproducing head 38 is rotated in the direction D which is the same as the rotating direction A of the magnetooptical disk 10, with an angular speed $\omega\frac{1}{2}$ (rad/sec.). Consequently the relative angular speed between the magnetooptical disk 10 and the reproducing head 38 is equal to $\omega\frac{1}{2}$ (rad/sec.), and the signal is reproduced with a transfer rate $R\frac{1}{2}$. The reproduced signal is taken out through the rotary transformer 42 and supplied to the unit II with a transfer rate $R\frac{1}{2}$. On the other hand, after signal recording to the point Y', the recording head 26 terminates the emission of the recording light beam 46 and the magnetic field, and is moved to a stand-by circle 72 containing the point X', by means of the first feed screw 24. It then awaits a full turn of the magnetooptical disk 10 in this position, and, in response to second block data from the unit I, again emits the recording beam 46 and the magnetic field to initiate the recording of said second block data from the point X', replacing the previous record. On the other hand, the spot of the polarized reproducing beam 48, after signal reproduction to the point Y', is instantaneously moved by the second feed screw 36 and the tracking means incorporated in the reproducing head 38 and starts the reproduction of the second block data from the point X'. The above-described procedure is repeated until all the required data are transferred from unit I to unit II.

FIG. 5 is a chart showing the change in position, in radial direction of the disk, of the spots of the recording beam 46 and of the polarized reproducing beam 48, wherein the abscissa represents the time while the ordinate represents the distance of each spot from the center of the magnetooptical disk. The distances of the positions X' and Y' shown in FIG. 4 are respectively represented by x' and y'. The full line indicates the position of the spot of the recording beam, while the broken line indicates that of the reproducing beam. In FIG. 5 there are also shown a time difference α for avoiding simultaneous recording and reproduction; a recording period a of the first block data; a reproducing period b of the first block data; a recording period c of the second block data; a reproducing period d of the second block data; and a waiting period e in which the emission of the recording beam 46 and the magnetic field from the recording head 26. As will be understood from FIG. 5, the apparatus of the present invention, when employed in the data transfer between two units of mutually different transfer rates, allows the information to be recorded at a determined data transfer rate and to simultaneously reproduce the information at a different data transfer rate, thereby reducing the entire transfer time.

In the foregoing embodiment the reproducing head is rotated in the same direction as that of the magnetooptical disk, but it may be rotated in the opposite direction in the case of data transfer from a unit of a lower data transfer rate to another unit of a higher data transfer rate. The rotating speeds of the magnetooptical disk and of the reproducing head need not be mutually different in case they are rotated in the mutually opposite direction.

The present invention is not limited to the foregoing embodiment but is subject to various modifications. In the foregoing embodiment the magnetooptical disk and the reproducing head are both rotated, but the same effect can be attained for example by independently rotating the magnetooptical disk and the recording head, or rotating the recording and reproducing heads. It is furthermore possible to rotate the magnetooptical disk, recording head and reproducing head. Furthermore, the present invention is not limited to the use in the aforementioned magnetooptical disk apparatus but also is applicable in any known information recording and reproducing apparatus utilizing a disk-shaped recording medium. However, in the use as a buffer memory for converting the data transfer rate between two different units, the recording medium is preferably of an erasable type allowing repeated use. An example of the erasable recording material other than the magnetooptical material is a material showing phase transition, such as tellurium oxides. Said material can assume a crystalline state or an amorphous state by heating for example with a laser beam, and the information recording is achieved by the change in reflectance between said two states. Furthermore, the structure of the recording head and the reproducing head may be arbitrarily changed within the scope of the known technology, according to the recording medium employed. For example in case of utilizing a recording medium utilizing the above-mentioned phase transition, means for generating an erasing beam for erasing the information recording on the recording medium is provided in the recording or reproducing head.

What is claimed is:

1. An information recording and reproducing apparatus comprising:

means for supporting a disk-shaped recording medium, said recording medium having opposing surfaces which allow information recording and reproduction from the opposing surfaces respectively, with respect to the same information;

a recording head positioned so as to be at one surface of said recording medium supported by said supporting means to record information on said recording medium;

a reproducing head positioned so as to be at the opposing surface of said recording medium supported by said supporting means to reproduce information recorded on said recording medium; and rotary drive means for independently driving at least two of said supporting means, said recording head and said reproducing head about a geometrically common axis so that the relative speed in the circumferential direction of said recording medium between said recording medium and said recording head is different from that between said recording medium and said reproducing head.

2. An information recording and reproducing apparatus according to claim 1, wherein said rotary drive means comprises plural rotary motors respectively connected to at least two of said supporting means, recording head and reproducing head.

3. An information recording and reproducing apparatus according to claim 1, further comprising means for independently displacing said recording head and reproducing head in the radial direction of said disk-shaped recording medium.

4. An information recording and reproducing apparatus according to claim 1, wherein said disk-shaped recording medium comprises a magnetooptical disk having a recording layer formed on a disk-shaped transparent substrate.

* * * * *